United States Patent [19]

Jordan

[11] 4,198,228

[45] Apr. 15, 1980

[54] CARBONACEOUS FINES IN AN OXYGEN-BLOWN BLAST FURNACE

[76] Inventor: Robert K. Jordan, Carlton House, Suite 1431, 550 Grant St., Pittsburgh, Pa. 15219

[21] Appl. No.: 939,431

[22] Filed: Sep. 5, 1978

Related U.S. Application Data

[63] Continuation of Ser. No. 743,050, Nov. 18, 1976, abandoned, which is a continuation of Ser. No. 634,613, Oct. 24, 1975, abandoned.

[51] Int. Cl.$^2$ ............................................... C21B 5/06
[52] U.S. Cl. ........................................................ 75/42
[58] Field of Search ...................................... 75/41, 42

[56] References Cited

U.S. PATENT DOCUMENTS

| 2,938,782 | 5/1960 | Toulmin, Jr. | 75/42 |
| 3,460,934 | 8/1969 | Kelmar | 75/41 |
| 3,814,404 | 6/1974 | Claflin | 75/42 |

*Primary Examiner*—M. J. Andrews

[57] ABSTRACT

A process for the production of molten ferrous metal in a vertical shaft furnace whose combustion zone is supplied with oxygen and a carbonaceous material, said carbonaceous material being suspended in carbon monoxide or carbon dioxide or mixtures thereof.

2 Claims, No Drawings

CARBONACEOUS FINES IN AN OXYGEN-BLOWN BLAST FURNACE

This is a continuation of application Ser. No. 743,050 filed Nov. 18, 1976, now abandoned, which in turn is a continuation of Ser. No. 634,613 filed Oct. 24, 1975, now abandoned.

This invention relates to the utilization of carbonaceous fines, especially coal fines, blown into an oxygen fired iron production furnace with carbon monoxide or carbon dioxide.

There are a number of proposed processes for the production of iron in furnaces, especially modified blast furnaces, using oxygen to achieve either of more efficient operation and a top gas having a higher heating value than the some 70 to 90 btus per cubic foot now realized using air. But in all these there is no real answer to the problem of coke, although in some of the patents and literature on the subject it is suggested that the amount of coke required can be somewhat reduced.

Thus Voskoboinikov et als, Stal 1970(April) 290-3 reported on the use of hot reformed reducing gases in a modified blast furnace equiped to utilized oxygen instead of air, but the essential advantage claimed was the reduction of coke consumption by only 20 percent. This was offset the the necessity to use a considerable amount of natural gas and moreover, reforming is an endothermic process requiring considerable energy and only by virtue of using the gas at over 1000° C. was any real heat recovered. Many patents have suggested similar processes, for example Kelmar, U.S. Pat. No. 3,460,934, suggests the use of a hydrocarbon fuel such as natural gas itself along with recycled top gas. Of course Kelmar and others appear facinated by the presence of hydrogen in the furnace as a reductant, but if the thruput of the furnace is to be significantly improved higher flame temperatures must be achieved, like 4000° F. compared to the present 3500° F. This requires high concentrations of oxygen and the use of auxiliary gases which although tempering the flame temperature to the extent of avoiding the burning of holes through the burden does not make excessive demands on the heat available. Kelmar presumed that higher thruputs can be achieved at the present flame temperatures which are as noted closer to 3500° F. because hydrogen is a more effective reducing agent than carbon monoxide, the active reductant in the conventional blast furnace. But actually the effectiveness of hydrogen is greatest at lower temperatures, about 2000° F., such as used in direct reduction processes. Hansgirg, in U.S. Pat. No. 2,337,551 also proposed the injection of hydrocarbon gases such as natural gas into the blast furnace modified to operate with oxygen, but his object was to provide a top gas akin to synthesis gas for the purpose of producing methanol and other chemicals. Coutant in U.S. Pat. No. 2,715,575 would accomplish this by injection of steam which would react with coke in the combustion zone. Sellers et al in U.S. Pat. No. 2,790,711 proposed injecting prepared synthesis gas into an oxygen blown iron furnace.

The difficulty is that that all these presume hydrogen to be a much more effective reducing agent than carbon monoxide, and, while this is true at low temperatures, i.e., 1800° F., it is not so at the very high temperatures required for high production rates, for example those flame temperatures of a typical blast furnace of some 3500° F. If the thruput of a blast furnace is to be significantly increased, for example nominally 40 percent but ideally by about 100 percent, it necessary to increase the flame temperature significantly. Moreover, it is undesirable to have hydrogen participating in the combustion process even though such water as would be formed is immediately converted by carbon or carbon monoxide back to hydrogen. Hydrogen has a very deleterious effect on flame temperature and at these high temperatures is essentially no better than carbon monoxide in the reduction of iron oxides.

Therefore, is is an object of my invention to provide an improved process for the production of a molten ferrous metal.

It is another object to provide an improved carbon use process for the production of a molten ferrous metal.

It is yet a further object to provide an improved process for the production of molten low carbon iron.

My invention is a process for the production of a molten ferrous metal in a vertical shaft furnace comprising the reduction of ferrous ores by a gas provided the interaction of oxygen with carbon in the presence of at least one of carbon monoxide and carbon dioxide at a flame temperature of at least 3500° F.

I have discovered that the use of oxygen in the production of iron in a modified blast furnace or in a vertical shaft furnace is greatly improved in the absence of hydrogen. The absence of significant concentrations of hydrogen simplifies the operation since it represents a complicating component, and further, facilitates achieving high flame temperatures. Thus the necessity to handle the various gases and moisture of the processes disclosed above is obviated and higher flame temperatures are more easily achieved at a lower consumption of energy, whether that energy be coal, coke, oil, natural gas or synthesis gas.

It is however, an important part of my invention to provide an accompanying gas to control the flame temperature. This is accomplished by the injection of a carbon oxide along with the oxygen. Thus carbon dioxide can be added as a mixture with oxygen since the two do not interact. But carbon monoxide must be added through separate tuyeres if the concentration of oxygen would be high, or if the temperature would be high. The temperature of of the carbon monoxide or the carbon dioxide or a mixture of the two may vary from cold to as high as 2000° F., although for the most simplistic operation it is preferred that all the gases be injected at low or modest temperatures. Thus for example, a mixture of about 80 percent carbon monoxide with 20 percent carbon dioxide, the anticipated top gas, may be recycled directly from the top of a modified blast furnace with cooling and cleaning at about 500° F. Or, if it is washed free of particulate matter at perhaps 100° to 200° F.

In its simplest form, the process of my invention would charge the required carbon as coke such as now practiced in blast furnace operation, along with the ore and fluxing material at the top of the furnace. But it is a preferred embodiment of my process to inject a carbonaceous material with the tempering gases fed directly into the combustion zone of the furnace in an amount up to and including the total carbon requirement of the process. This clearly obviates the use of coke, instead coals, charcoals, wood and coke breeze in carbon monoxide or carbon dioxide or mixtures are usable. These simplification, which eliminates hydrogen in any significant concentration, enables the production of high flame temperatures which are tempered essentially with carbon or carbon monoxide. Also it enables operation substantially without preheating if desired, another simplification.

In order to show the advantages of the process calculations for the basic requirements are shown in Table 1.

Table 1

| Oxygen-blown furnace using recycled top gas | | |
|---|---|---|
| Flame temperature | 3500° F. | 4000° F. |
| $O_2$ required, lb/THM | 1040 | 870 |
| Carbon required, lb/THM | 1117 | 948 |
| Coke rate, lb/THM | 1380 | 1120 |
| Coke above normal, lb/THM | 300 | 150 |
| Production, % of normal | 160 | 200 |
| Top gas make, scfm/THM | 40,000 | 30,000 |
| Recycled top gas, % | 35 | 29 |
| HM rate in a 29' BF, ton/min. | 3.2 | 4.0 |

The data clearly shows the advantages of operation at temperatures now considered high for blast furnace operation. Though the consumption of coke is above that required in an analogous present blast furnace it is easily seen that the rates are very much higher in terms of hot metal production. As noted earlier, the use of natural gas or steam or other materials that form significant concentrations of hydrogen cause problems in the economic and technical production of the high temperatures desirable in the process. As noted above, in my process the control of the is simplified and further, a substantial portion or even all the carbon required in the process can be supplied as a suspended material in the carbon monoxide or carbon dioxide or mixture thereof. Note that in the patent of Kelmar his example shows a consumption of 1100 pounds of coke, 60 pounds fuel oil and 25 pounds of natural gas as fuel, and of the solid carbonaceous materials, 200 pounds of 1100 pounds, less than 20 percent, is injected into the combustion zone. While at the time Kelmar patented his process fuel oil and natural gas were cheap and plentiful, such is not the case now.

In the process of my invention, the only hydrogen present is that from the coal or from the moisture present in the coal or top gas recycle or other materials injected into the combustion zone. Ideally the top gas should contain less than 2 percent by volume hydrogen which compares to over 10 percent noted by Kelmar, Hausgirg and Sellers et al.

While it is preferred to utilize a low sulfur pulverized coal for injection into the combustion zone by the process of my invention, coke breeze, charcoal and other solid carbonaceous materials may be utilized. Ideally the particle size should be small, under 100 mesh, so that essentially complete burning can be achieved in the combustion zone minimizing losses up the stack. But larger size material may be used.

The carbonaceous material to be injected into the combustion zone should be added as a suspended material in either or both carbon monoxide and carbon dioxide.

Practically all the literature on the subject of blast furnace operation with oxygen attempts to use in some way recycled top gas. But in my copending application Ser. No. 555,159 filed Mar. 4, 1975 and entitled Coproduction of Iron With Methanol and Ammonia, I disclose that separation of carbon monoxide and carbon dioxide is easily and economically achieved by use of a solvent for carbon dioxide such as methanol. Thus it can be especially simple to use either carbon monoxide or carbon dioxide, or whatever ratios of mixtures thereof that provide the greatest benefits. For example, it is clear that the addition of carbon dioxide into the combustion zone necessitates the consumption of both heat and carbon. Clearly the use of carbon monoxide alone can eliminate this problem, although this could on the other hand require considerable quantities of carbon monoxide. Alternatively carbon dioxide alone may be used since in the combustion zone of an oxygen-blown furnace considerable heat must be redistributed if excessively high flame temperatures, such as would affect lining life, are to be avoided.

But the injection of all the carbonaceous fuel to be utilized in the process of my invention offers a remarkably new opportunity to conserve an extra measure of carbon not even appreciated by others. In the production of iron in a blast furnace of today or in a modified oxygen-blown blast furnace heretofore contemplated, the presence of carbon in the burden necessitates that the molten iron produced contain carbon because of it high solubility in the metal. The affinity of carbon for metallic iron in either the solid or molten state is well known and so long as there is carbon in contact with the ore as it is being reduced in the furnace, the product will contain iron.

If however, by my process, all the carbon required in the process is injected directly into the combustion zone in a form suspended in the gases, the problem of carbon dissolution in the metal is avoidable since there is no contact. Iron produced in a blast furnace contains upwards of 4 percent carbon, or some 90 pounds of carbon per ton of hot metal. The same would be true of the oxygen-blown processes noted earlier herein. But by the special case of the process of my invention, iron essentially free of carbon may be produced perhaps enabling avoidance of the typical steelmaking process in which the carbon is removed by the addition of oxygen. Thus 90 pounds of carbon can be saved representing over a hundred pounds of coke, roughly a 10 percent savings.

Such a special case also enables metal production under less reducing conditions than are required for metal production as known heretofore. And while this can provide an additional carbon savings it does not compare with those noted above. Further it should be noted that typical blast furnace hot metal melts at roughly 1150° C. which compares to 1535° C. for pure iron. This can make handling and transportation of the product molten metal more difficult. Also the fact that the burden would contain no carbon can make it more sensitive to temperature making it difficult to avoid excessive flame temperatures which might cause holes to be burned in the burden.

The range of temperatures applicable to the process of my invention goes beyond those specifically noted. Ideally the temperature should be as high as can be managed over a protracted period without significant damage to the various sections of linings. As is clearly indicated in the table, the higher the flame temperature the lower the requirement for carbon, and while 4000° F. is noted as probably an immediate upper limit, that is only because of the lining materials. Given adequate linings, there is no reasons why much higher temperatures should not be contemplated.

While beyond the scope of this application it should also be recognized that a serious concern exists on operation of an oxygen-blown furnace with respect to a severe temperature gradient from the combustion zone to the top of the furnace. This can be easily overcome by injecting very large amounts of either or both carbon monoxide and carbon dioxide. But excessive amounts could be counterproductive to the maintenance of high flame temperatures. To a degree this can also be handled by utilizing high pressures in in the furnace. Indeed the top pressure can range up even 10 atmospheres, although at this time it would appear desirable to operate at from near atmospheric pressure to 3 atmospheres, perhaps ideally at about 2 atmospheres.

There is no upper limit to the percentage of the carbon which may be fed into the combustion zone. With the modern pelletized ore, the function of coke to act as a spacing material capable of considerable support is obviated. Therefore it is desirable to use such an ore and supply all the carbon into the combustion zone by injection as a suspension in either of both carbon monoxide and carbon dioxide, or if the carbon oxide and oxygen are used as mixtures, in the oxygen containing mixture. This is noted because mixtures of carbon dioxide and oxygen are stable and if the oxygen contained is sufficiently dilute and cold, can tolerate carbon in its various forms without combustion until reaching the combustion zone. Likewise it should be noted that at relatively low temperatures mixtures of oxygen and carbon monoxide are stable, especially at low oxygen concentrations. Further, various additives may be used to increase the stability of such mixtures, for example up to 1000° F. using nitrogen oxides.

While it is not stressed herein, the gases fed to the combustion zone may be preheated. Here it should be noted that the upper limit is that at which a substantial part of the carbonaceous material reacts with its carrier used to transport it into the combustion zone. While ideally the heat should be provided indirectly, some may be obtained by partial precombustion. Also it should be mentioned that the burden and carbonaceous material may be preheated before charging into the furnace.

Ideally the process may be conducted in a converted blast furnace stripped of the usual stoves associated with a blast furnace complex. The various mechanical devices for injecting the gases and solids into the combustion zone are well discussed in the various patents and references noted at the beginning of this disclosure and it is not necessary to substantially alter the furnace itself and its associated facilities beyond that which is therein disclosed. However, while the discussion is directed to the production of metallic iron above, it should be recognized that the process is ideally applicable to the production of ferroalloys, for example ferromanganese. Operations at very high flame temperatures is especially condusive practically all the ferroalloys which are now produced in electric furnaces. Even ferrosilicon and ferrotitanium may be made. With the application of higher temperatures there is an opportunity to employ a wider range of slagging materials and combinations.

According to the provision of the patent statutes, I have explained the principle of my invention and have illustrated and described what I now consider to represent its best embodiment. However, I desire to have it understood that within the scope of the appended claims the invention may be practiced otherwise than as specifically illustrated and described.

I claim:

1. A process for the production of molten ferrous metals containing upwards of about 4% carbon in a blast furnace comprising
    charging the furnace at the top with iron ore, coke and a fluxing material,
    injecting a blast comprising substantially pure oxygen and a solid carbonaceous fuel suspended in a recycled top gas at a flame temperature of at least about 3500° F.
    and recovering a molten ferrous metal containing upwards of about 4% carbon.

2. A process for the production of iron essentially free of carbon in a blast furnace comprising
    charging the furnace at the top with iron ore and a fluxing material and
    injecting a blast comprising substantially pure oxygen and all of the solid carbonaceous fuel required in the process suspended in a recycled top gas at a flame temperature of at least about 3500° F.

* * * * *